Figures 1, 2:
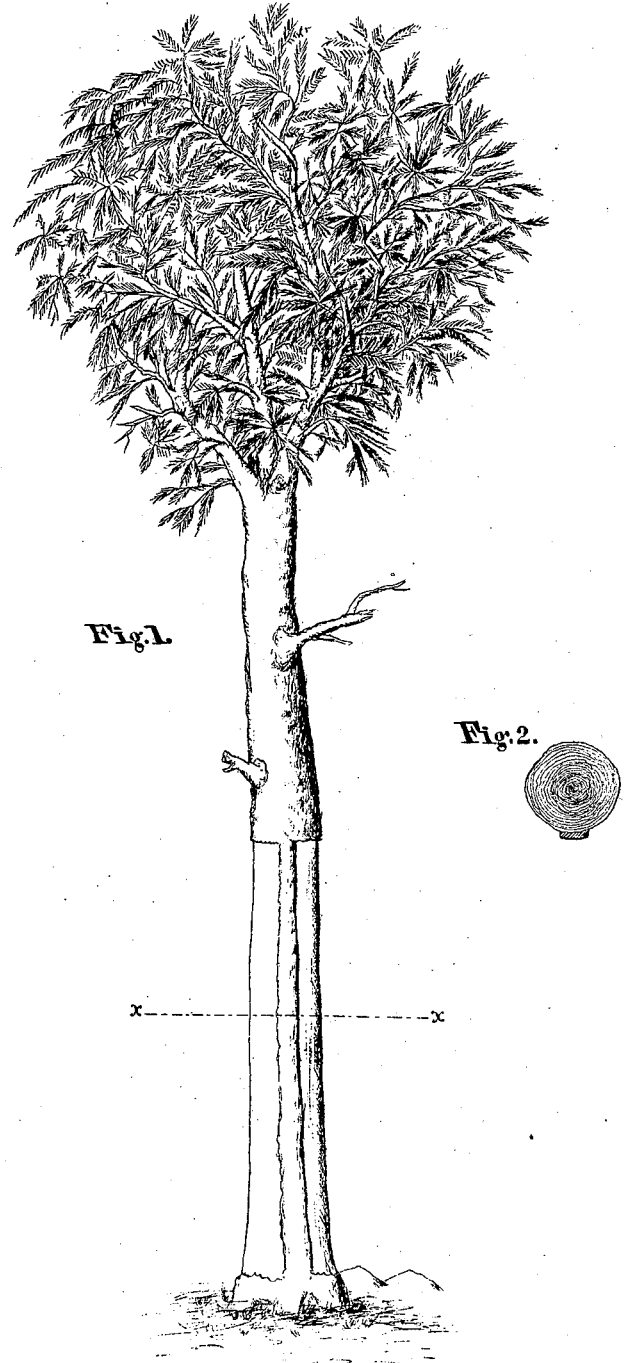

J. H. Gatling,
Preserving Wood.
No. 113,158.    Patented Mar. 28, 1891.

Witnesses.    Inventor.
              J. H. Gatling,
              Chipman Hosmer & Co,
              Attorneys.

United States Patent Office.

JAMES H. GATLING, OF MURFREESBOROUGH, NORTH CAROLINA.

Letters Patent No. 113,158, dated March 28, 1871.

IMPROVEMENT IN TREATING THE TIMBER OF OLD FIELD-PINES.

The Schedule referred to in these Letters Patent and making part of the same.

*To all whom it may concern:*

Be it known that I, JAMES H. GATLING, of Murfreesborough, in the county of Hartford and State of North Carolina, have invented a new and valuable Improvement in a Process for Improving the Timber of Old Field-Pine; and I do hereby declare that the following is a full, clear, and exact description of the construction and operation of the same, reference being had to the annexed drawing making a part of this specification and to the letters and figures of reference marked thereon.

Figure 1 of the drawing is a representation of a pine tree, showing how my process is applied.

Figure 2 is a sectional view through the line *x x*.

My invention has relation to a new article of lumber, the result of the application to "old field-pine" trees of a novel process of preparation, whereby the external or sap-wood is converted into a substance resembling in appearance and durability the wood of the "long leaf" or heart-pine tree.

The method of preparing the old field-pine tree may be thus described.

Having selected a tree of suitable dimensions for the piece of timber required, the bark is skinned off, commencing several inches above the ground, and extending upward on the south side of the tree to such a height as is necessary to make a piece of timber of the required length. The tree is not girdled, however.

A strip of bark four or five inches in width is left on the north side of the tree, connecting the band of bark remaining at the root with that at the top of the tree, in the manner indicated in the drawing. This barking should be done in the spring of the year, when the sap is rising.

The effect of this operation will be to produce a flow of the sap or turpentine to the decorticated surface, which will become coated with pitch.

After this outside crust is formed, the pitch that ascends will lodge in the pores next the crust, thoroughly saturating the wood, and rendering it similar to the wood of the heart-pine.

In the spring of the next year the strip of bark on the north side of the tree is removed. A crust of pitch will then form on the denuded surface, and the wood of the tree will become saturated in this portion in the same manner as the other side of the tree was impregnated the previous year.

The tree can be cut for use at any time after the following summer, the time required for completing its preparation being about eighteen months.

By the process above described the tree is made to acquire an outer layer or protecting stratum of durable weather-proof wood, similar to what is commonly called light wood.

The kind of pine that I propose to utilize by this process is the *pinus tæda*, or old field-pine, the wood of which is utterly worthless except for fuel, and for mere temporary purposes of construction, on account of the rapid decay of the albumen on exposure.

By choosing trees of suitable dimensions, masts and spars may be obtained which will be strong and durable. By hewing the tree on two opposite sides the first year, and on the other two sides the second year, timber may be obtained which will be suitable for joists, railroad-ties, &c. Kindling-wood, which is getting scarce in the neighborhoods of towns and cities, may be obtained in the same manner.

What I claim as my invention, and desire to secure by Letters Patent, is—

1. The process herein described of preparing the old field-pine tree, as specified.

2. The timber, provided with an external layer of resinous wood, when obtained from the old field-pine tree by the process specified.

In testimony that I claim the above I have hereunto subscribed my name in the presence of two witnesses.

JAMES H. GATLING.

Witnesses:
C. H. FOSTER,
THOS. H. NICHOLSON.